United States Patent [19]
Roach et al.

[11] Patent Number: 5,434,394
[45] Date of Patent: * Jul. 18, 1995

[54] AUTOMATED ORDER AND DELIVERY SYSTEM

[75] Inventors: John V. Roach; Richard Hollander, both of Fort Worth, Tex.

[73] Assignee: Tandy Corporation, Fort Worth, Tex.

[ * ] Notice: The portion of the term of this patent subsequent to Aug. 8, 2011 has been disclaimed.

[21] Appl. No.: 201,784

[22] Filed: Feb. 25, 1994

Related U.S. Application Data

[63] Continuation of Ser. No. 942,946, Sep. 10, 1992, Pat. No. 5,310,997.

[51] Int. Cl.⁶ .............................................. G06F 15/20
[52] U.S. Cl. ...................................... 235/375; 235/385
[58] Field of Search ................... 235/375, 383, 385; 364/401, 402, 403, 404, 405

[56] References Cited

U.S. PATENT DOCUMENTS

| | | | |
|---|---|---|---|
| 4,578,572 | 3/1986 | Hice | 235/472 |
| 4,621,189 | 11/1986 | Kumar et al. | 235/472 |
| 4,676,343 | 6/1987 | Humble et al. | 186/61 |
| 4,722,054 | 1/1988 | Yorozu et al. | 364/401 |
| 4,766,295 | 8/1988 | Davis et al. | 235/383 |
| 4,797,818 | 1/1989 | Cotter | 364/401 |
| 4,858,121 | 8/1989 | Barber et al. | 235/380 |
| 4,929,819 | 5/1990 | Collins, Jr. | 235/383 |
| 4,947,028 | 8/1990 | Gorog | 235/383 |
| 4,959,686 | 9/1990 | Spallone et al. | 364/401 |
| 4,975,841 | 12/1990 | Kehnemuyi et al. | 364/401 |
| 4,984,155 | 1/1991 | Geier et al. | 364/401 |
| 5,003,472 | 3/1991 | Perrill et al. | 364/401 |
| 5,013,896 | 5/1991 | Ono et al. | 235/383 |
| 5,047,614 | 9/1991 | Bianco | 235/385 |
| 5,158,155 | 10/1992 | Domain et al. | 235/383 |
| 5,186,281 | 2/1993 | Jenkins | 235/383 |
| 5,189,287 | 2/1993 | Parienti | 235/375 |
| 5,208,446 | 5/1993 | Martinez | 235/380 |
| 5,310,997 | 5/1994 | Roach et al. | 235/375 |

FOREIGN PATENT DOCUMENTS

| | | |
|---|---|---|
| 0176354 | 9/1985 | European Pat. Off. . |
| 4134872 | 4/1993 | Germany . |
| 2202664 | 10/1985 | United Kingdom . |

OTHER PUBLICATIONS

IBM Technical Disclosure Bulletin; Portable Self-Checkout Retail System; vol. 35 No. 1A Jun. 992; pp. 315-318.

*Primary Examiner*—Donald Hajec
*Assistant Examiner*—Jeffrey R. Filipek
*Attorney, Agent, or Firm*—David L. McCombs; Frederick W. Padden

[57] ABSTRACT

A system for processing merchandise sale transactions for customers in a point of sale and warehouse facility. A main processor has a database for storing customer identification information and merchandise information and processes sale transaction records for customers. A point of sale system coupled to the processor has a controller and at least one pen-based computer in communication with the controller via RF transmissions. Program instructions respond to entry on the computer of a customer number and to entry of merchandise identification numbers to build a sale transaction record of selected items for purchase. The program instructions display item information and enable selection of items for addition to the sale transaction record, display delivery method instructions and enable their selection for addition to the sale transaction record, and transmit the transaction record to the processor to effectuate warehouse delivery of the selected items according to the selected delivery instructions. The system integrates point of sale and warehouse processing functions to enable delivery of merchandise to customers in the shortest possible time.

23 Claims, 12 Drawing Sheets

400

```
Hello: Joe Smith      1234567890    David Johnson
              PTS:    1925          1400 Two Tandy Center
                                    Fort Worth, TX 76102

Enter Item: _____ (OK)

Item No.    Description       Price+Points    Qty    Total
01-23456    MAGN RX4240WA       1300.00        1     1300.00  #
92-01010    12 Month Home     Expires 12/01/92  1     129.95  #
XX-XXXXX    Delivery Charge      40.00         1      40.00   #
22-43245    Sanyo Car Stereo   200.00+100      1     200.00   #
XX-XXXXX    Car Stereo Install    29.95        1      29.95   #

Subtotal:  1699.90
                                         Tax:    84.99
                                      Points:     100

( Total )  (Modify ) ( Exit  )
(       )  (        ) (       )
```

```
Hello: Joe Smith      1234567890    David Johnson
              PTS:    1925          1400 Two Tandy Center
                                    Fort Worth, TX 76102

Enter Item: _____ (OK)

Item No.    Description       Price+Points    Qty    Total
01-23456    MAGN RX4240WA       1300.00        1     1300.00  #
        Item Entry Information               2  1     129.95  #
                                                 1     40.00  #
  Item Code: 01-23456        Available           1    200.00  #
 Description: MAGN RX4240WA                      1     29.95  #
   Pts Needed: 2000 (X) Reg Price  : 1300.00
 Pts Available: 1925 ( ) Point Price: 1199.99  Subtotal: 1699.90
                                                    Tax:   84.99
     Quantity: _____    Sale Price: 1300.00      Points:    100

(Override) (Discount) ( Cancel ) ( OK  )
 (        ) (        ) (        ) (     )
```

Hello: Joe Smith     1234567890     David Johnson
                PTS:  1925          1400 Two Tandy Center
                                    Fort Worth, TX 76102

Enter Item: _____ (OK)

Item No.    Description         Price+Points    Qty    Total
01-23456    MAGN RX4240WA          1300.00       1    1300.00  #
            Delivery Method                2     1     129.95  #
                                                 1      40.00  #
       ( ) Package p/u                           1     200.00  #
       ( ) Dock                                  1      29.95  #
    *  ( ) Auto Installation Dock
       (X) Deliver
       ( ) UPS                            Subtotal:  1699.90
       ( ) Delayed Package p/u                Tax:     84.99
       ( ) Freight                         Points:      100

Hello: Joe Smith     1234567890     David Johnson
                PTS:  1925          1400 Two Tandy Center
                                    Fort Worth, TX 76102

Enter Item: _____ (OK)

Delivery Information                    Total
                                                1300.00  #
Deliver to Name: _____         129.95  #
                                                  40.00  #
Street Address: _____          200.00  #
                                                  29.95  #
         City: _____

State: |__| ZipCode: |__|__|__|__|__|__|__|__|__|    1699.90
                                                              84.99
 Phone Number: (|__|__|__|) |__|__|__|-|__|__|__|__|            100

Alternate Phone: (|__|__|__|) |__|__|__|-|__|__|__|__|

```
Hello: Joe Smith      1234567890      David Johnson
                      PTS:  1925      1400 Two Tandy Center
                                      Fort Worth, TX 76102

Enter Item: _____ (OK)

Item No.    Description           Price+Points    Qty     Total
01-23456    MAGN RX4240WA         1300.00          1     1300.00  #
            Delivery Schedule                 2    1      129.95  #
                                                  1       40.00  #
    Available Delivery Dates:                     1      200.00  #
    ( ) 1 Friday   xx/xx/xx AM                    1       29.95  #
    ( ) 2 Friday   xx/xx/xx PM
    ( ) 3 Saturday xx/xx/xx AM
                                         Subtotal: 1699.90
    Customer Choice:    ( )AM   ( )PM        Tax:   84.99
    ( )M ( )T ( )W ( )TH ( )F ( )SA       Points:     100

Cost: xxxxxx.xx
                           ( OK  )
                           (     )
```

```
FSP1S002              Initial Sales Selection

Select one of the following:

1  Sale
    2  No-sale
    3  Non-sales
    4  Item Lookup
    5  Member Lookup
    6  Return
    7  Redeem Credit Memo
    8  Special Order
    9  Price Protection Refund Type your selection number, then press Enter.  1

Enter the member number. _____

F1HELP   F2    F3QUIT  F4     F5     F6     F7     F8     F9     F10
```

*FIG. 5*

```
MSHIP001              MEMBERSHIP APPLICATION
                                                              800
       1  Display a Member
       2  Add a Member
       3  Change a Member
       4  Delete a Member
       5  Adjust Member Points
       6  Replacement/Lost Member Card
       7  Visitor Member Card
       8  Print Membership Card
       9  New Thunder Charge Account Processing
      10  Review Thunder Charge Applications
      11  Commercial Charge Account Processing Type your selection number then press ENTER: __

F1      F2    F3 QUIT  F4     F5     F6     F7     F8    F9     F10
```

*FIG. 8a*

```
MSHIP010              DISPLAY A MEMBER
                                                              802

GERALD SMITH          Member Number:    1234567890123456
  14 MAIN ST.           Total Points :    123456

FORT WORTH, TX 76102  Thunder Charge:     N
  COUNTRY : US          Commercial Charge:  N
  Telephone: ( )  -     Member Status(M,T,V,C): M

F1 F2 CHANGE F3 QUIT F4 F5 F6 F7 F8 F9 PRINT CARD(S) F10 PRINT SCREEN
```

*FIG. 8b*

AUTOMATED ORDER AND DELIVERY SYSTEM

This is a continuation of application Ser. No. 07/942,946 filed on Sep. 1, 1992 now U.S. Pat. No. 5,310,997.

TECHNICAL FIELD

The invention relates to apparatus and process for integrating the order and delivery of retail merchandise and particularly to an automated system for integrating point of sale and warehouse processing functions in the selection, order and delivery of merchandise.

BACKGROUND OF THE INVENTION

Many computer-based systems have been devised for automating various aspects of the shopping process. Electronic inventory, product scanning and order processing devices are available in many retail establishments to increase the efficiency of transactions and thereby improve service to the customer. Such equipment is utilized in some stores having a format in which the retail point of sale and merchandise warehouse are located in a combined facility. This format is often operated by placement of just one representative sample of the especially large items in the retail area, with the remainder stored in the remote warehouse portion of the facility in effort to maximize the use of display floor space. When an item is purchased, the customer must wait while the merchandise is routed to a designated pick-up and loading area.

While known computer-based automation systems have reduced the cost and increased the efficiency of handling retail customer transactions, numerous disadvantages and shortcomings exist in their application to the combined point of sale and warehouse retail store format. A system is needed in which the point of sale and warehouse processing functions are coupled and operate in real-time support of each other. Elements of the system need to be integrated to provide a highly efficient operation which reduces the number of required sales, warehouse and check out personnel, and which improves the timely communication of information between such personnel and to the customer. Improvements in automation of this type are required to establish an information-based flow of customers through a store which maximizes the customer's shopping experience.

SUMMARY OF THE INVENTION

The foregoing problems are solved and a technical advance is achieved by method and apparatus for processing merchandise sale transactions for customers in a point of sale and warehouse facility in which a point of sale computer system is coupled with a warehouse computer system, and the two systems operate in support of each other. In a departure from the art, a series of interface programs allow the warehouse processing functions to cooperate with the point of sale processing functions in order to provide an efficient merchandise selection and delivery process.

A further enhancement to the purchasing process is realized with the use of hand-held, pen-based sale transaction computers. These computers are utilized by store personnel to assist customers in their buying decisions. The computers communicate with a controller of the point of sale system through radio frequency transmissions, and make the entire sale transaction record available to the customer and the store personnel on the merchandise display floor at the point of decision. Using scanning technology, the sale transaction computers read a unique membership card which identifies the customer, and a universal product code label which identifies the merchandise to be purchased. Upon scanning the merchandise, information is displayed to the customer regarding the merchandise and regarding delivery options for the merchandise. The customer selections are entered into the sale transaction record, which is stored in the point of sale system until the customer checks out of the store at a check out area and pays for the merchandise. Once the merchandise is selected at the point of decision, the point of sale system sends information to the warehouse facility to enable the merchandise to be picked from the warehouse and sent to the delivery location, thereby minimizing the wait time required for the customer to take possession of the merchandise. When the customer elects to check out, all transactions can be recreated electronically and tendered in the shortest possible time.

In a preferred embodiment, the apparatus includes a main store processor having a database for storing customer identification information and merchandise information and which processes sale transaction records for customers. A point of sale system coupled to the processor has a controller and at least one pen-based computer in communication with the controller via RF transmissions. Program instructions respond to entry of the customer's identification number and to entry of merchandise identification numbers to build a sale transaction record of selected merchandise for purchase. The program instructions display merchandise information and enable selection of merchandise for addition to the sale transaction record, display delivery method instructions and enable their selection for addition to the sale transaction record, and transmit the transaction record to the processor to effectuate warehouse delivery of the selected items according to the selected delivery instructions. A warehouse system coupled to the processor generates an item pick request in the warehouse to locate the selected merchandise and to initiate delivery according to the selected delivery instructions. A check out system coupled to the point of sale system accesses the sale transaction record and accepts payment for the selected merchandise.

Automated systems are also provided to assist the efficient operation of the facility, including systems to establish customer membership and charge accounts, and to verify credit at check out. Also included is a system to project labor schedules based on sales history and to produce payroll information on a scheduled basis. The system is connected to a remote headquarters computer for facilitating the timely communication of information to the point where it is required.

An important technical advantage achieved with the invention is the integration of point of sale and warehouse processing functions to enable delivery of merchandise to customers in the shortest possible time.

Another technical advantage achieved with the invention is real time access to merchandise availability, price, warranty and delivery information at a single point of decision for the customer, and the ability to offer selections to the customer based on this information.

Another technical advantage achieved with the invention is a store process flow which minimizes the use of store personnel yet which maximizes the provision of information and selection opportunities to the customer, thereby improving the shopping experience.

BRIEF DESCRIPTION OF THE DRAWINGS

FIGS. 4a–4e are screen displays of a sales transaction computer of the system of FIG. 1;

FIG. 5 is a screen display of a checkout register of the system of FIG. 1;

FIGS. 8a–8b are screen displays of member registration information associated with the member registration functions of FIGS. 7a–7b.

DETAILED DESCRIPTION

Figure 1:
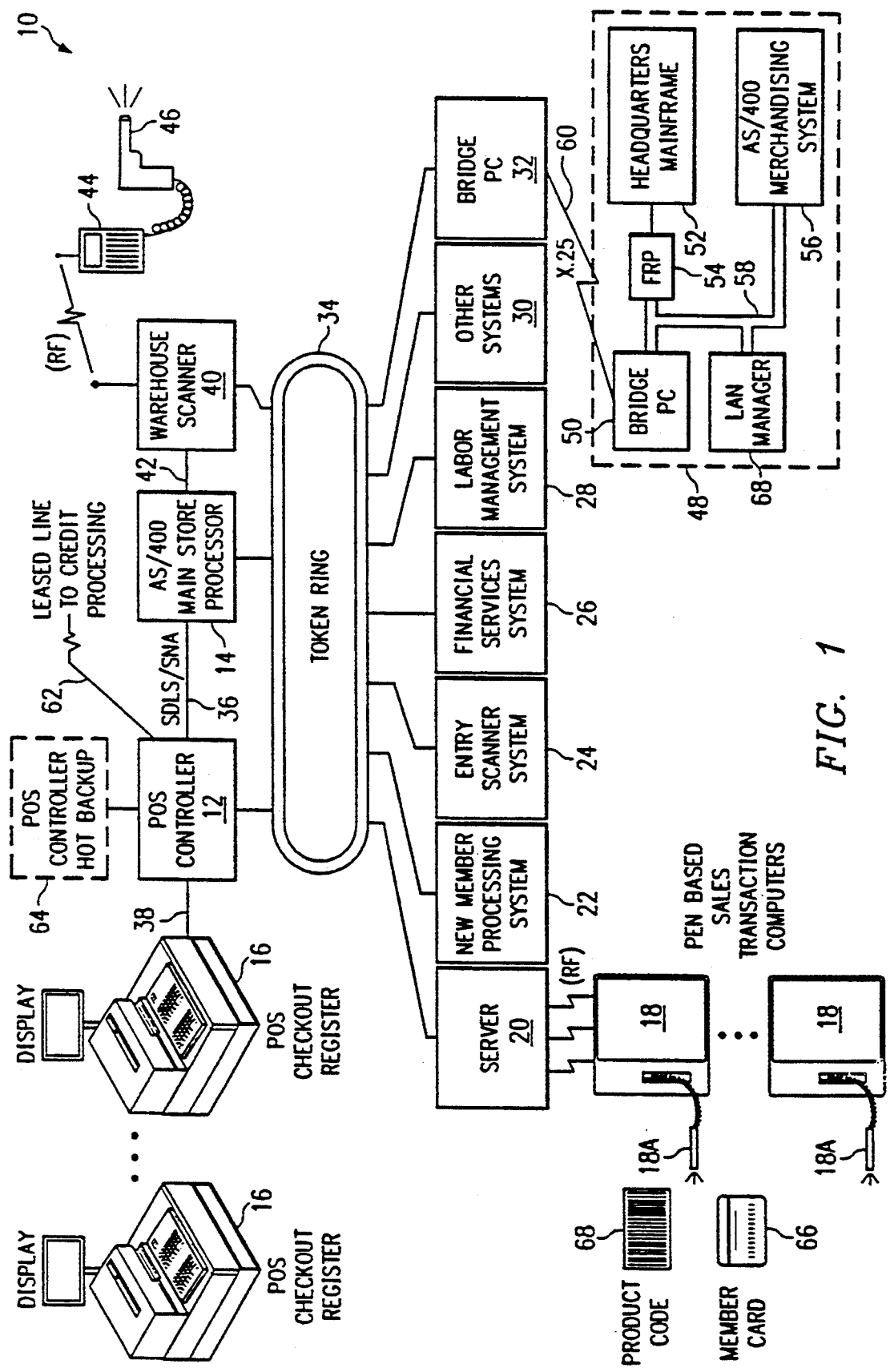
FIG. 1 is a functional block diagram illustrating an automated order and delivery system of the present invention.

In FIG. 1, the reference numeral 10 designates an automated order and delivery system embodying principles of the present invention. As discussed in detail below, the system 10 is intended for use in a retail store 200 (FIG. 2) in which the point of sale and merchandise warehouse are located in a combined facility. The system 10 integrates point of sale and warehouse processing functions used in the selection, order and delivery of merchandise to customers.

The system 10 includes a point of sale (POS) controller 12, a main store processor 14, POS check out registers 16 and pen-based sales transaction computers 18. The pen-based computers 18 communicate via radio frequency (RF) transmissions with a server 20 of the system 10. The system 10 further includes a new member processing system 22, an entry scanner system 24, a financial services system 26, a labor management system 28, other systems 30 and a bridge personal computer (PC) 32.

The POS controller 12, the main store processor 14, the server 20 and systems 22-32 reside on a local area network (LAN) comprising a time shared, token ring 34 topology. It is understood that the token ring 34 is configured using a standard communications protocol.

The POS controller 12 is connected to the main store processor 14 on line 36 which represents a synchronous data link control (SDLC) systems network architecture (SNA) protocol.

The POS checkout registers 16 are connected to the POS controller 12 on line 38, comprising standard "Type 2" cable. A warehouse scanner 40 is connected on line 42 to the main store processor 14. A portable unit 44 with an attached scan gun 46 communicates with the scanner 40 via RF transmissions.

A computer system 48 at a remote location communicates with the system 10. The system 48 is preferably located at a central management facility and communicates with a plurality of stores 200 (FIG. 2), each having a system 10. The system 48 includes a bridge PC 50, a headquarters main frame computer 52, a front end processor 54 and a merchandising system 56. The bridge PC 50, front end processor 54 and merchandising system 56 reside on a local area network (LAN) comprising token ring 58. The system 48 and system 10 are interconnected by a leased line 60 connected between the bridge PC 50 and the bridge PC 32. The line 60 may be leased through CompuServe, for example, utilizing an X.25 protocol.

The POS controller 12 is an IBM PS2 personal computer which includes a Model 4680, Version 4 operating system. An IBM store management application (SMA), release 2, level 9102, preferably, is the point-of-sale application running on the controller 12. A remote credit processing facility is connected via a leased line 62 to the controller 12. The credit processing facility is the Sears Payment System, for example. An alternate POS controller 64 is connected to the controller 12. The alternate POS controller 64 is identical to the controller 12, and operates as a "hot backup" for the controller 12, in case of malfunction. A labor management application available from Infotronix may also run on the back up controller 64, as described further below. While not shown, it is understood that three or more POS controllers 12 may be connected to the main store processor 12 for operation in the store 200.

The POS controller 12 processes select functions in cooperation with the other elements of the system 10. The controller 12 performs new member card processing functions in connection with the new member processing system 22. The controller 12 includes a lottery file which contains up-to-date information of customers in the store for access by other systems 30, including a disc jockey system for performing in-store lottery prize give-aways and other activities. Membership, pricing, inventory and transaction files are created and maintained in the controller 12. With respect to transaction files, a transaction record is established for each customer in cooperation with the pen-based computers 18 through the server 20. As a transaction record is created for the items purchased by each customer, the controller 13 cooperates in real time with an AS/400 distribution center system (DCS) warehouse inventory system application running on the main store processor 14. The controller 12 creates picking and reverse picking ticket data for directing warehouse delivery and return, respectively, of merchandise. Final checkout functions are performed by the controller 12 in cooperation with the POS checkout registers 16.

The main store processor 14 is an IBM AS/400 which uses an IBM OS/400 operating system. The main store processor 14 includes as its primary application the AS/400 distribution center system (DCS) warehouse inventory system. The DCS is a real time distribution control system which tracks merchandise and directs work flow in the warehouse. The DCS relies on a native relational database in the processor 14 to track and control movable units. Scanners 40 are connected to the processor 14 via line 42. The scanners 40 utilize radio frequency terminals 44 to provide work direction and receive input from scanning guns 46. The DCS residing in the processor 14 includes several modules that work together to provide tracking control as well as processing in the form of receiving, picking and shipping. The processor 14 interfaces with the controller 12 and the merchandising system 56 so that the applications, including purchase order and customer order applications, have access to the latest data. The processor 14 includes an interface for translating the various applications to and from the controller 12. The processor 14 maintains and runs a primary membership and sales history application, consolidates daily sales and payroll for transmission to the headquarters main frame 52. The processor 14 receives price change and related information from the merchandising system 56 for use by the controller 12. The processor 14 further receives picking and reverse picking requests from the controller 12 for use by the DCS warehouse application.

The point of sale check out registers 16 are IBM Model 4683 cash registers. Each register 16 includes 4 megabytes of memory, a 12-inch full screen monochrome display, a magnetic stripe reader, a scanner, an ANPOS keyboard and an attached model 2 POS printer. Each register 16 further includes a feature "A" adapter card, used for full screen display, and feature "C" or "E" adapter cards needed for serial printing. Additional IBM proprinters (not shown) are serially attached to each register 16 for printing receipts.

The new member processing system 22 comprises a Tandy personal computer (PC) attached via the token ring 34 to the POS controller 12. It is understood that each PC comprising the system 22 will be running 3151 emulation. The new member processing system 22 includes application code which operates in the POS controller 12. The system 22 captures customer information from data entry and links the customer information to a unique member identification. The member identification is included on an unique identification card 66 which is issued to the customer. Utilizing the system 22, membership files are created which include an AS/400 membership file which will reside on the main store processor 14, and a 4680 membership file on the POS controller 12, which contains a subset of the information on the AS/400 membership file. The 4680 membership file is a keyed file with a 16-digit membership number serving as the key to the file. Additional detail regarding member processing and the use of member information is discussed further below.

The entry scanner system 24 comprises a standard scanning device for reading the optically or magnetically encoded data stored on the member card 66. The scanner system 24 is connected via the LAN 34 to the POS controller 12. The scanner system 24 updates files in the controller 12 containing lottery information and in-store membership.

The pen-based sales transaction computers 18, preferably, are PalmPad model 2352 computers manufactured by GRiD Systems, Inc. Each computer 18 is a handheld personal computer which mounts to the hand and forearm of the user. Each computer 18 includes an infrared light pen 18A which can be utilized for making selections on the screen of the computer, reading member cards 66 and reading product code labels 68. The product code labels 68 are affixed to merchandise (not shown) and provide universal product code (UPC) designations pertaining to the merchandise.

Each computer 18 communicates with the server 20 via RF transmission. The server 20 preferably is a Novell LAN server comprising a Tandy PC. The server 20 and computers 18 preferably utilize Novell Netware Version 2.2 and the Novell Development Tool Kit, available from Novell Corporation. Located throughout the store 200, the computers 18 function to process orders for merchandise from customers.

The computer 18 scans the customer's member card 66, then scans the product code label 68 associated with a particular piece of merchandise. A transaction record of the sale is created and forwarded to the controller 12. Selection and delivery scheduling options are provided to the customer by the computer 18. The computer 18 is capable of retrieving credit balance information for the customer. The transaction record created for the sale is forwarded from the controller 12 to the main store processor 14, for immediate use by the DCS Warehouse retrieval system. Additional detail regarding merchandise selection, order and delivery functions involving the computers 18, the controller 12 and the processor 14 is described further below.

The financial services system 26 comprises a Tandy PC attached via the LAN 34 to the POS controller 12. The system 26 is utilized to access membership data contained in the controller 12 and to process special store charge accounts associated with each customer member card 66. The financial services functions are further described subsequently in detail.

A labor management application is also available which runs on the backup POS controller 64. The labor management application is available from Infotronix. The labor management program provides daily payroll information within the store 200 and also to the headquarters system 48. The labor management system further maintains employee data for the store and develops and prints work schedules. Sales history data on the POS controller 12 is periodically accessed for performing labor scheduling.

The other systems 30 comprise Tandy personal computers located throughout the store 200 for performing various functions. For example, a child care function is available on a PC (not shown) attached to the token ring 34. The child care PC scans a customer member card 66, retrieves membership record information from the controller 12 and captures child information through data entry. The foregoing information is utilized for day care-related activities and enforcement of security involving child care.

Figure 2:
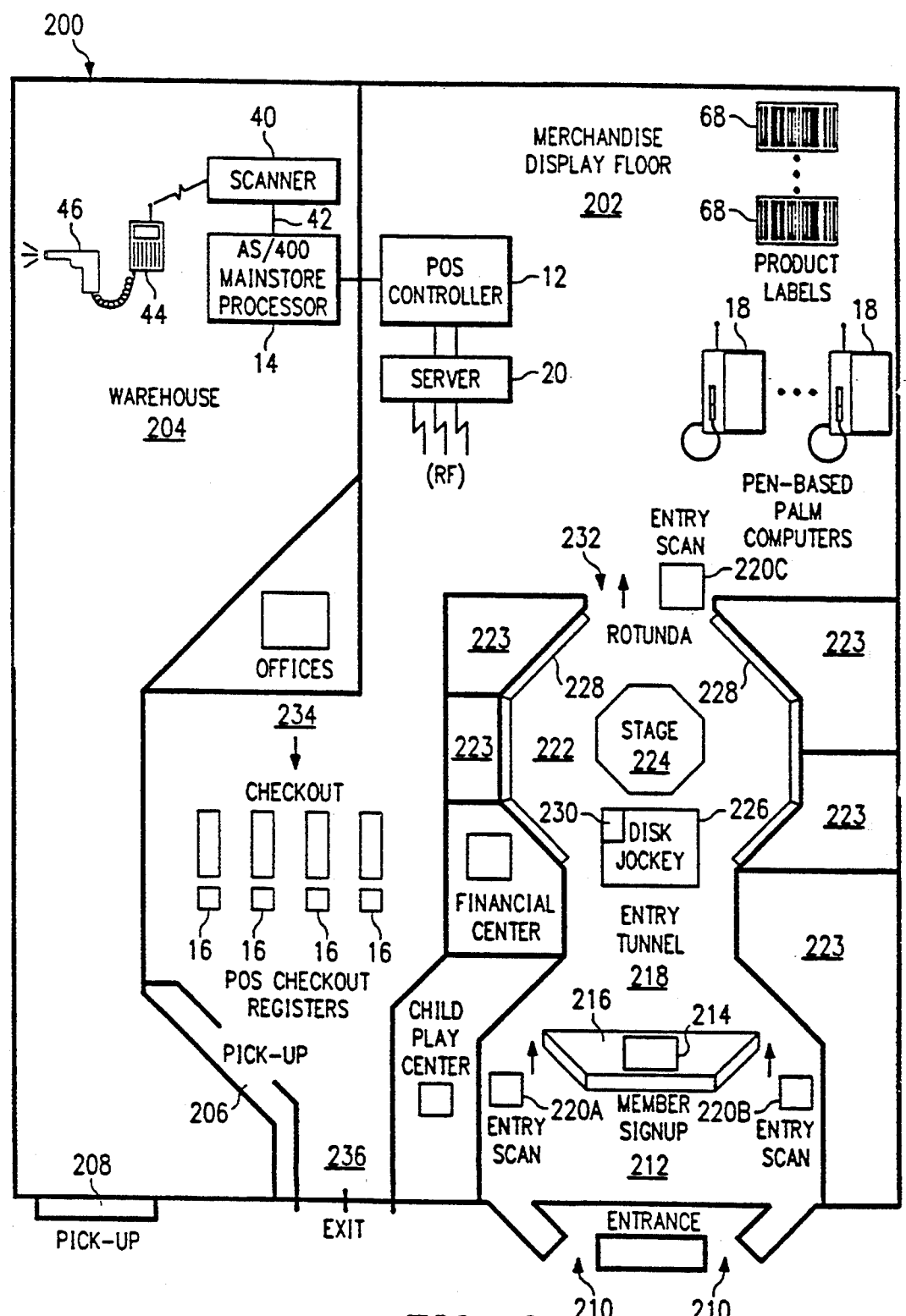
FIG. 2 is a plan view of a store including the system of FIG. 1.

The other systems 30 also include a Tandy PC 226 (FIG. 2) located in the rotunda 222 (FIG. 2). The PC 226 is attached to the controller 12 via the LAN 34. In-store population information maintained on the PC 226 is utilized in connection with various promotional activities. Lottery data from the controller 12 is used for selecting prize winners via a random number generator. The PC 226 further controls advertising displays such as a video array or video monitor screens (not shown) located in the rotunda 222. The other systems 30 also include Tandy PC's located throughout the store 200 for performing installation and delivery scheduling functions. Scheduling information is received from the computers 18 via the LAN 34 by scheduling PC's (not shown) to process installation based scheduling, displaying installation scheduling and maintaining statistics on scheduling. It is understood that installation scheduling may include the installation of various merchandise in automobiles, for example.

The bridge PC 32 and the bridge PC 50 located in the headquarters computer system 48 each comprise IBM PS/2 computers. The bridge PC's 32 and 50 are used to connect the token ring 58 of the headquarters system 48 and the token ring 34 of the store system 10 over the leased line 60. The bridge PC's 32 and 50 provide for network management via NetView and a LAN manager 69 connected to the token ring 58. The LAN manager runs on an IBM PS/2 computer (not shown) and interfaces to NetView in the main frame 52. The LAN manager provides network management data for all downstream network components.

The headquarters mainframe 52 is an Amdahl computer with a Digital Equipment Corporation front end processor 54. The mainframe 52 processes financial data for each system 10. The merchandising system 56 is an IBM AS400 computer with a merchandising application provided by JDA, Inc. The system 56 provides summary input to the general ledger system of the mainframe 52. The system 56 further provides daily processing of data for each system 10, including daily sales and payroll information and information relating to inventory control. The system 56 further sends purchase order and price change information to each system 10.

The system 10 enables the flow of information in real time between the POS controller 12, the main store processor 14 and the sales transaction computers 18. Data flowing from the main store processor 14 to the POS controller 12 includes information relating to price changes, merchandise item file changes, inventory file changes and master membership file updates. Data flowing from the controller 12 to the main store processor 14 includes information relating to transaction records, picking ticket data, including reverse picking tickets (on-line message), updates to delivery schedules (on-line message), in-store member file changes and negative check file changes. Data flowing from the sales transaction computers 18 to the POS controller 12 include transaction data, information relating to special orders, picking tickets and reverse picking tickets, delivery scheduling data and open-to-buy credit inquiry requests. The data flow from the controller 12 to the sales transaction computers 18 includes suspended transaction data, membership data, including customer name and points, item data (price, description, points, add-ons, warranty), inventory data, negative check file information, status messages for negative file actions, delivery scheduling data, warranty data, delivery charges and open-to-buy credit inquiry response information.

Data flow from the controller 12 to the other systems 30 include, for the disc jockey function, lottery file information with member number, name and store entry time. Data flow from the controller 12 to the credit processing facility (Sears payment system) includes credit card authorization requests, store charge card authorization requests, check authorization requests, open-to-buy credit inquiry requests, exception transaction data and new account processing requests. Data flow from the credit processing facility to the controller 12 includes store charge card authorization responses, check authorization responses, open-to-buy credit inquiry responses, exception transaction data responses and new account processing responses.

FIG. 2 illustrates a retail store 200 in which the system 10 is embodied. The store 200 is configured to combine a retail point-of-sale display area 202 and a merchandise warehouse 204 in a single facility. This arrangement for the store 200 enables the placement of a representative sample of merchandise items (not shown) in the point-of-sale display area 202 with a quantity of the items being stored in the warehouse 204. When an item is purchased by selection in the display area 202, a corresponding item in the warehouse 204 is moved to an internal pick up area 206 or alternatively a pick up loading zone 208, accessible from the exterior of the store 200. As described in detail below, the system 10 enables the expedient flow of customer traffic through the store 200 with a minimum of sales, warehouse and check out personnel being required.

Operation of the system 10 will now be described with reference to FIGS. 1 and 2. A customer enters the store 200 through the entrance 210 and is received in a membership registration area 212. A customer must register to receive a membership card 66 in order to make purchases in the store 200. A PC 214 which operates the new member processing system 22 is located at a member sign-up desk 216 in the registration area 212. The system 22 is utilized to issue a member card 66 to the customer. If the customer has a valid member card, the customer can continue to the entry information tunnel 218 after his member card 66 is scanned utilizing the entry scanner system 24, operated on scanners 220A, 220B located adjacent opposing sides of the sign-up desk 216. If the member card is not valid, the customer is asked to return to the registration area 212 prior to shopping. Membership functions of the system 10 are described in greater detail below.

Information Tunnel to Rotunda

The customer enters the information tunnel 218 where various forms of merchandise information are displayed. The customer's name is displayed in the information tunnel 218 following a preselected delay from the time of entry scan by one of the scanners 220A, 220B. The information tunnel 218 opens to a rotunda 222, where there is located a center auction stage 224 and a disc jockey facility 226. A video array or plurality of television screens 228 surround the upper periphery of the rotunda 22. The disc jockey facility 226 controls the display of information on the screens 228. The disc jockey facility 226 includes a PC 230 on which operates the disc jockey application of systems 30. The disc jockey application is utilized to select lottery winners from a list of members currently in the store. When a winner is announced over a public address system (not shown), the winner is instructed to proceed to the disc jockey facility 226 to receive a certificate for the lottery prize. Auctions on special merchandise are conducted on the stage 224 and sold to the highest bidder.

Little Stores

Surrounding the rotunda 222 are specialty stores 223. These may include, for example, audio/video, karoake, photography, personal electronics, electronic games, software and accessories. Located in each specialty store is a POS check out register 16. The customer must pay for merchandise selected in each specialty store prior to leaving the specialty store. The merchandise purchased in each specialty store 223 is placed in a sealed bag when purchased.

Big Store

A customer enters the merchandise display floor 202 through a second information tunnel 232 adjoining the rotunda 222. An additional scanner 220C is available for scanning the customer's member card 66 prior to entry into the merchandise display floor 202. While not shown, it is understood that the merchandise display floor 202 may include interspersed information kiosks located throughout the store to give the customer specific product information. Also, it is understood that the merchandise display floor 202 may have different departmental areas, such as major appliances, video/camcorders, home improvement, home theater, entertainment, car electronics, satellite dishes and associated equipment, cellular phones, television, sound rooms, audio and home office. A customer can purchase any of the items throughout the store as will be described.

Sales personnel throughout the store 200 and within the merchandise display floor 202 carry pen-based sales transaction computers 18. The computers 18 are used mainly to order merchandise for a customer. The customer can order merchandise in different areas of the merchandise display floor 202 with different sales personnel. All merchandise ordered by the customer will be merged into a single transaction record, stored on the POS controller 12, and created on one or more of the pen-based sales transaction computers 18. This transaction record is retrieved at the final checkout area 234, where the customer pays for the merchandise at a POS checkout register 16.

It is understood that products throughout the merchandise display floor 202 contain attached product code labels 68. When a customer wishes to make a purchase, the sales personnel reads the member card 66 utilizing the pen of the computer 18. Upon reading the member card 66, the customer's name appears on the display of the computer 18. The pen of the computer is used to read the product code label 68 of the customer's selected merchandise. Upon reading the label 68, information concerning the selected merchandise appears on the display of the computer 18.

The sales person may then be prompted by the computer 18 to offer the customer "add-on" or additional items. These items may be accessories or complementary items for the merchandise selected.

computer 18 may also prompt the sales personnel to offer installation services and extended warranty contracts to the customer.

Further, the computer 18 prompts a determination of delivery/pick up method. The sales person is prompted to ask the customer if they will pick up the merchandise at the internal pick up area 206, the loading dock area 208 or would like the merchandise delivered.

The customer is also offered installation services, if appropriate. Upon entry of the delivery method into the computer 18, the warehouse 204 through the processor 14 is immediately notified if delivery to one of the pick up areas 206, 208 is required. All items ordered by the customer, whether through one or more sales persons, are stored in a single transaction record pertaining to that customer. Because information concerning delivery from the warehouse 204 is obtained immediately upon selection of the merchandise by the customer on the merchandising display floor 202, the merchandise can be transported to the pick up area 206 or 208 very quickly, typically prior to check out by the customer.

The pen-based sales transaction computers 18 may be used to refer to item data to show a description, item price, frequent purchaser point value, reduced price with points (if applicable), unit of measure, extended warranties available and stock availability. The pen-based sales transaction computers 18 further may be used to look up membership information, such as membership number, name, address, telephone number, accumulated frequent shopper points, credit availability, and receipt of advertising mailings indicator. Additional detail concerning the sales transaction process is set forth below.

Warehouse Distribution System

There is a two-way interface between the DCS application residing on the AS/400 processor 14 in the warehouse 204, and the POS controller 12. The POS controller 12 relies on the DCS application to provide accurate information of sale inventory. The DCS relies on the controller 12 to provide particular order information. Every time a customer places an order, a pen-based sales transaction computer 18 order interface is triggered to pass that order information along to the DCS system. The computer 18 interface sends the DCS customer pick up orders, delayed customer pick up orders, home delivery orders, installation orders and UPS delivery orders. The processing of orders is code-file driven, or directed by using an order/command function. Order picking can be done in an interactive fashion through the use of RF terminals such as scanner 44. Warehouse personnel can perform single order picking, batch or wave picking where many orders are picked simultaneously and sorted at a staging area (not shown). When an order is received from the computer 18 interface for immediate customer pick up at the customer service desk in the internal pick-up zone 206 or the pick-up loading zone 208, the order is released automatically and the inventory for the order is allocated from the warehouse 204. A pick will be generated and presented to a warehouse picker employee based on the picker's profile. The sequencing of picks are based on the order type, with customer pick-ups having the highest priority. Within the customer pick-up order type, the picks are sequenced by first-in, first-out (FIFO). Once the picker selects an item for picking, a customer pick-up label with the customer's name and order number is automatically generated on the portable printer of the picker's scanner 44. After the item is picked and labeled, it is placed on a conveyor (not shown) where it is diverted to an appropriate destination location, 206, 208.

Final Check Out

After ordering merchandise and services in merchandise display floor 202, the customer proceeds to the final check-out area 234. Check-out personnel operate the POS check-out registers 16 to perform customer check-out functions. The customer's membership number from the card 66 is entered into the register 16. The existing sales order transaction record is displayed on the screen of the register 16. The check-out cashier (not shown) is then able to review the order with the customer, add to the sale any additional items requested, or to void any unwanted items. The cashier is able to total the sale and accept cash, checks, gift certificates, credit cards, traveler's checks, store charge cards, and coupons as valid tenders. The customer is further able to purchase items with previously accumulated frequent shopper points, as indicated on the screen of the register 16. Credit authorization and data capture functions are performed by communication over the leased line 62 between the store 200 and the remote credit processing facility. Requests for credit authorization from the register 16 are authorized by the remote credit processing facility, through the POS controller 12. The register 16 receives the authorization status and pertinent information which is stored in the transaction log for further processing. Exception transaction data is forwarded off-line from the check-out register 16 to the credit processing facility. Backup copies of each day's data capture file are maintained in the register 16. The checkout register 16 is able to access item data from the controller 12 including item description, price, point value, reduced price with points, unit of measure, extended warranties available and stock availability.

Membership information, including membership number and the customer's name and address, telephone number, accumulated points and the like are also available at the register 16.

A terminal (not shown) connected to the main store processor 14 is located in the departure area 236 of the store 200 to allow customers to change their delivery method after the customer has left the merchandise display floor 202. Also, sales personnel at the pick up area 206 are able to access the main store processor 14 directly to change the delivery/pick up method.

Upon check-out at the register 16, members are logged out of the store and are no longer eligible for the prize give-away lottery. If a customer leaves the store without being checked out at the register 16, after a period of time the system 10 will automatically log the customer out and they are no longer eligible for the prize give-away lottery.

Figure 3A:
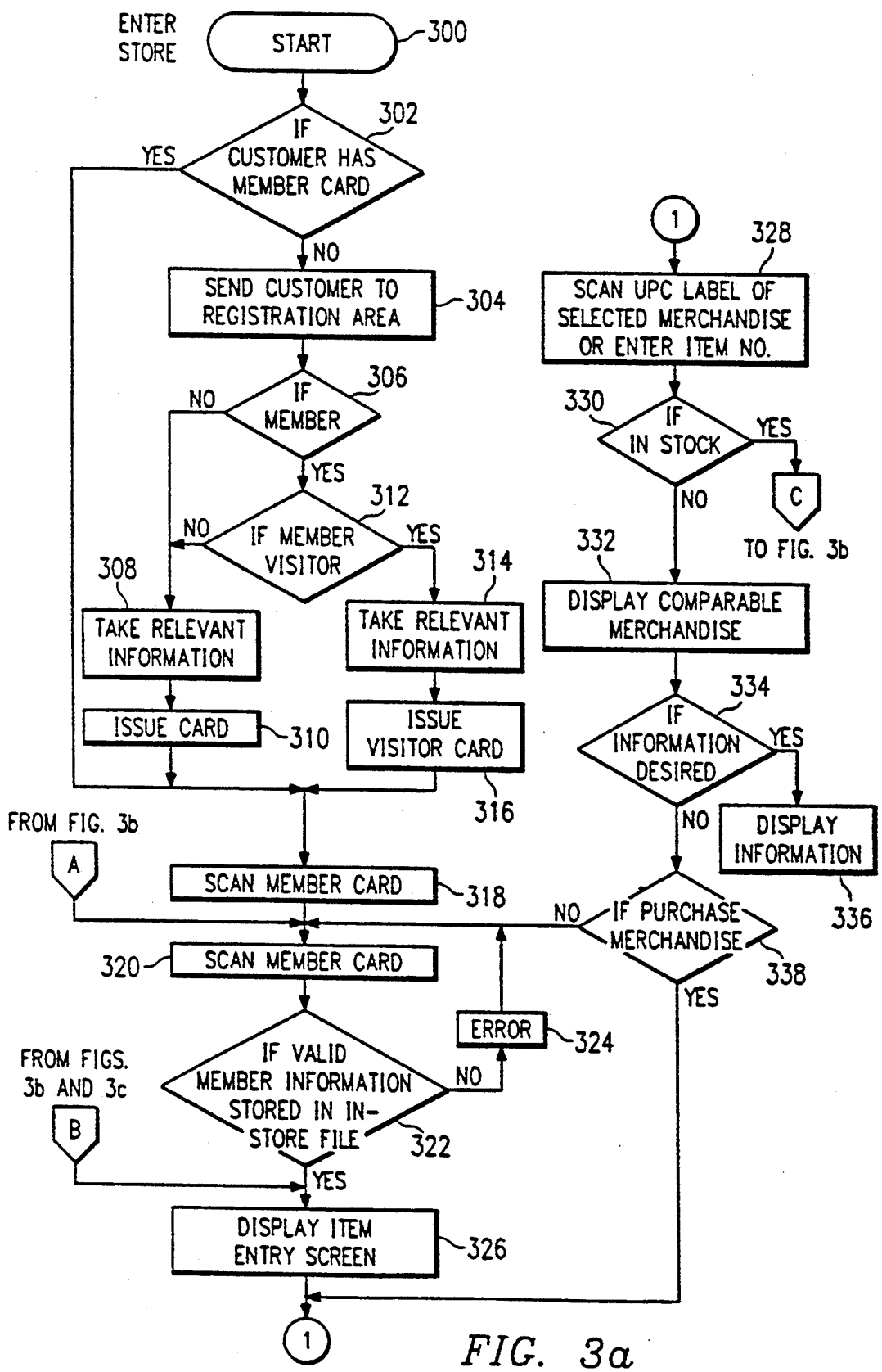
FIGS. 3a–3c are flow charts illustrating logic for implementing the selection, order and delivery functions of the system of FIG. 1.
Figure 3B:
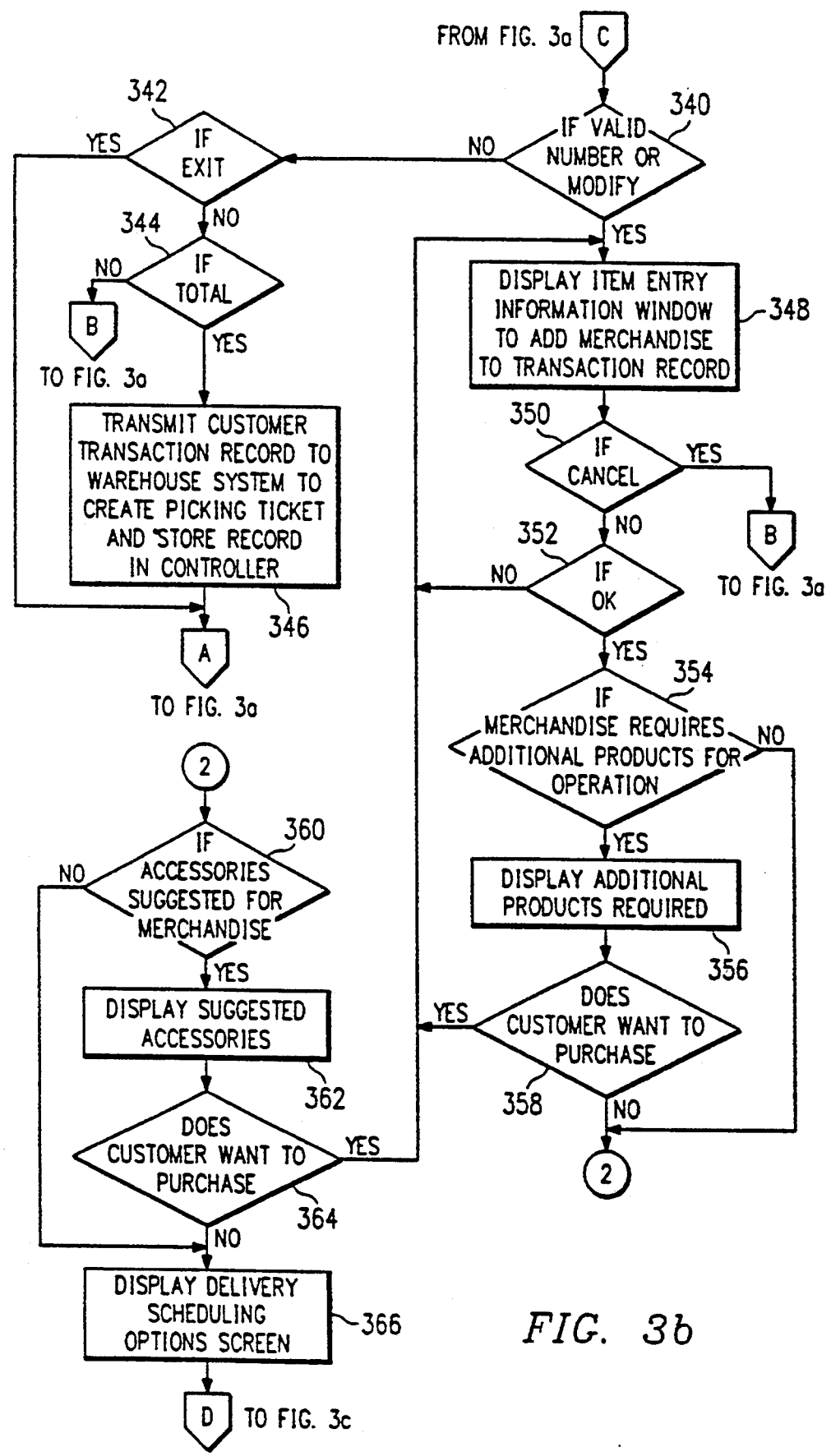
Figure 3C:
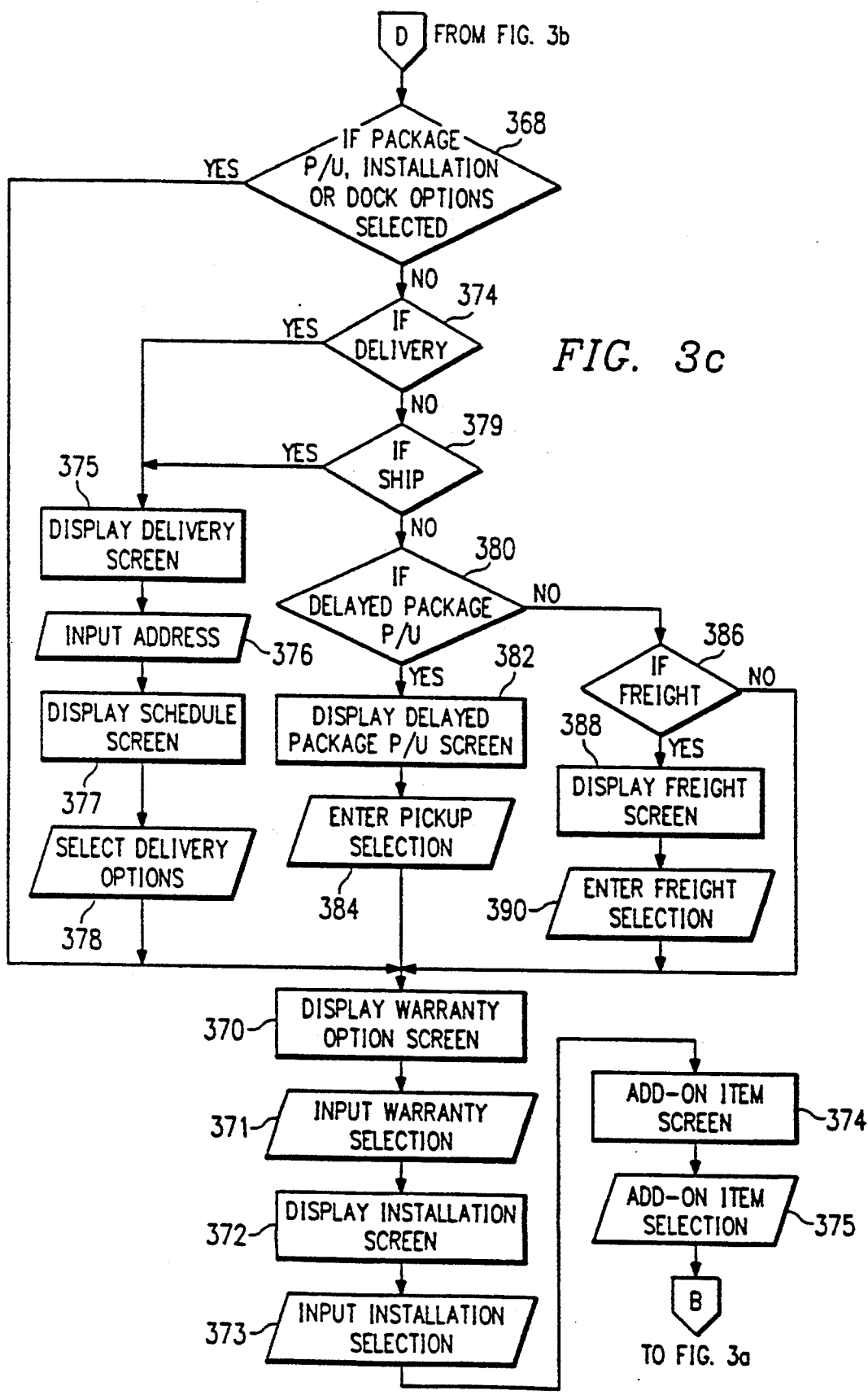

Operation of the system 10 will now be described with reference to FIGS. 3 and 4. FIGS. 3a–3c are flow charts illustrating logic for implementing the selection, order and delivery functions of the retail store 200. FIGS. 4a–4c illustrate screen displays generated by the sales transaction computers 18 in performing the selection, order and delivery functions.

In step 300 (FIG. 3) a customer enters the store 200. In step 302 a determination is made whether the customer has a membership card to be presented for admission to the store. If the customer does not have a membership card, the customer is sent to the membership registration area according to step 304. If the customer is not a member according to step 306, the relevant membership information is taken in step 308 and the customer is issued a card in step 310. If the customer is a member in step 306 and the customer is not a visitor in step 312, the relevant membership information is similarly taken in step 308 and the customer is issued a card in step 310. If the customer is a member in step 306 and is a visitor in step 312, the relevant visitor information is taken in step 314 and the customer is issued a visitor's card in step 316. The foregoing membership registration steps are later described in greater detail with reference to FIGS. 7 and 8.

In step 318, the customer's membership card is scanned and the customer's membership information is stored in an in-store membership file. It is understood that the customer then proceeds to the entry tunnel 218 and may select merchandise for purchase.

In step 320, the operator of a pen-based sales transaction computer 18 scans the customer's membership card in order to initiate a potential transaction. While not shown, the display screen of the computer 18 prompts the operator to enter the member number directly, or scan the member card to receive the member number. In step 322, if the membership information input to the computer 18 is not stored in the in-store membership file, or if the number is not valid (such as for bad credit), in step 324 an error is indicated. If in step 322 it is determined that a valid member number has been entered, in step 326 the computer 18 displays an item entry screen used for building a sales transaction record for the customer. The item entry screen is illustrated in FIG. 4a and is designated by the reference numeral 400. The screen 400 indicates the customer name, member number and frequent shopper points earned at the top position of the screen. The screen 400 also includes several fields of information comprising the transaction record. The fields include item number; description; price and points; quantity; and price total. The fields also include a subtotal, tax and designation of frequent shopper points used. If a member has already created a transaction record by requesting the purchase of items previously during the day from another sales associate, that information is included in the transaction record and is displayed. The screen 400 includes Total, Modify and Exit commands in the lower left portion of the screen, the function of which are described below.

In the example of FIG. 4, the member has ordered Magnavox TV with a 12-month home warranty, and has requested the TV to be delivered. Also, the member has ordered a Sanyo car stereo which is to be installed. The stereo is being purchased using a price-plus-points option.

It is understood that the above product information comprising the transaction record was entered into the computer 18 using the light pen 18A to scan the product code labels 68 and to select various options on the screen 400.

If additional purchases are to be added to the transaction record, in step 328 the appropriate item number is entered into the computer 18 by the operator, such as by scanning the item label 68. In step 330, a determination is made whether the selected item of merchandise is stock. If the selected item is not in stock, in step 332 the computer 18 prompts the operator to suggest products comparable to the unavailable merchandise by displaying information on the screen of the computer. In step 334, a determination is made whether the customer desires information concerning products comparable to the unavailable merchandise. If the customer desires information concerning products comparable to the unavailable merchandise, the computer 18 in step 336 displays comparable product information. If the customer does not desire information concerning products comparable to the unavailable merchandise, execution proceeds directly to step 338.

In step 338, a determination is made whether the customer desires to purchase the comparable merchandise. If not, execution proceeds to step 340. If in step 320 the member does desire to purchase comparable merchandise, execution returns to step 328, the universal product code on the selected merchandise is scanned, and execution proceeds to step 330. If in step 330 it is determined that the selected merchandise is not in stock, execution again proceeds to step 332. If in step 330 it is determined that the selected merchandise is in stock, execution proceeds to step 340.

In step 340 (FIG. 3b), it is determined whether either a valid item number has been input to the computer 18 or the Modify function has been selected. If not, execution proceeds to step 342 where a determination is made whether the Exit function has been selected. If in step 342 it is determined that the Exit function has been selected, execution returns to step 320 without saving any information and the member number entry screen is displayed. If in step 342 it is determined that the Exit function has not been selected, execution proceeds to step 344.

In step 344, a determination is made whether the Total function has been selected. If not, execution returns to step 326. If in step 344 it is determined that the Total function has been selected, execution proceeds to step 346. In step 346, the transaction record is sent to the warehouse system residing on the processor 14 through the controller 12. The transaction record is used to create picking tickets for enabling warehouse location and retrieval of the merchandise. Reverse picking tickets are also created for items which have been deleted from the transaction. Further, if any item has already had a picking ticket created but the delivery method or information has changed, a reverse picking ticket with the old information is created and sent to the processor 14 followed by a picking ticket with the new information. The information comprising the transaction record is then saved and execution returns to step 320.

If in step 340 either a valid number has been input or the modify function has been selected on the computer 18, execution proceeds to step 348. In step 348, a pop-up Item entry information window 402 is displayed in the lower left hand corner of the item entry screen 400 of the computer 18, as shown in FIG. 4b. The item entry information window 402 includes the merchandise item code, description, regular price, point price, points needed for point price and item availability. The regular price and point price options have mutually exclusive selection buttons to the left of them, which enables the operator to select which price the member is to use. If the member does not have enough points available to use the points price, the points price button will be disabled. The sales price is displayed in the price field, once the operator has selected the price to be used and the quantity has been entered. The item entry information window 402 includes command designations for implementing override, discount, cancel and OK functions, of which the cancel and OK functions are described below.

In step 350, a determination is made whether the cancel function has been selected. If in step 350 it is determined that the cancel function has been selected, execution returns to step 326 where the item entry screen is displayed and any additions or changes made to the displayed items are discarded. If in step 350 it is determined that the cancel function has not been selected, execution proceeds to step 352. In step 352, a determination is made whether the OK function has been selected. If not, execution returns to step 348. If in step 352 it is determined that the OK function has been selected, execution proceeds to step 354.

In step 354, a determination is made whether the selected in-stock merchandise requires any additional products for operation. If so, in step 356 the computer 18 prompts the sales personnel with a display (not shown) listing additional products required for the operation of the selected merchandise. In step 358, a determination is made whether the customer desires to purchase the additional required products. If in step 358 it is determined that the customer desires to purchase the additional required products, the additional products are added to the transaction record in step 348, and execution proceeds to step 350.

If in step 354 it is determined that the selected in-stock merchandise does not require any additional products for operation, execution proceeds directly to step 360. Similarly, if in step 358 the customer does not desire to purchase the additional required products, execution proceeds directly to step 360.

In step 360, a determination is made whether there are any accessories that might be suggested for the selected in-stock merchandise. In step 362, the computer 18 displays suggested accessories for the selected merchandise. In step 364, a determination is made whether the customer desires to purchase any of the suggested accessories. If in step 364 it is determined that the customer desires to purchase some of the suggested accessories, the suggested accessories are added in step 348 to the transaction record, and execution proceeds to step 350. If in step 360 it is determined that there are no accessories that may be suggested for the selected in-stock merchandise, execution proceeds directly to step 366. Similarly, if in step 364 it is determined that the customer does not desire to purchase any of the suggested accessories, execution proceeds directly to step 366.

In step 366, the computer 18 displays the delivery options for the selected merchandise. A delivery method pop-up window 404 is displayed in the lower left hand corner of the Item Entry screen 400, as shown in FIG. 4c. The delivery method window 404 provides the operator with the plurality of delivery option selections including package pickup (P/U); dock; auto installation dock; delivery; UPS; delayed package pickup; and freight. Once the operator has selected a delivery method and entered the OK command, execution proceeds to step 368.

In step 368 (FIG. 3c), a determination is made whether either a package pickup, auto installation or dock delivery options has been selected. If one of the foregoing is selected, execution proceeds to step 370. In step 370, a warranty pop-up window (not shown) is displayed in the lower left hand corner of the item entry screen 400 which includes a plurality of warranty options. In step 371 a warranty selection is entered. To select a warranty option, the operator uses a select command (not shown) to the left of each of the options, and if a warranty is selected the warranty will be displayed on the item entry screen 400. Once the warranty option has been selected and the OK command is entered, or a decline command (not shown) is entered, execution proceeds to step 372.

In step 372, an installation option window (not shown) is displayed in the lower left hand corner of the item. To select an installation option the operator uses a select button (not shown) to the left of the desired option. If an installation option is selected, it will be displayed as a line item on the item entry screen 400. Once an installation item has been selected and an OK or decline command is entered, execution proceeds to step 373.

In step 373, an add-on item window (not shown) is displayed in the left hand corner of the item entry screen 400. The add-on item window prompts the operator to suggest add-on items of merchandise to the customer. Once the operator makes a selection from the items or declines by entering the appropriate command, execution returns to step 326 where the item entry screen 400 is displayed.

If in step 368 it is determined that the package pickup, auto installation or dock options have not been selected execution proceeds to step 374. In step 374, a determination is made whether the delivery option was selected from the delivery method window 404. If in step 374 it is determined that the delivery option has been selected from the delivery method window 404, execution proceeds to step 375. In step 375, a delivery information pop-up window 406 (FIG. 4d) is displayed in the lower left hand corner of the item entry screen 400. The delivery information window 406 displays the member name, address, telephone number, and alternate phone number as the default delivery information, which can be confirmed or changed by the operator by entering the appropriate commands. In step 376, the operator can strike through the displayed information and fill in information if different from the default information. Once the operator enters the OK command, execution proceeds to step 377.

In step 377, a delivery schedule pop-up window 408 (FIG. 4e) is displayed in the lower left hand corner of the item entry screen 400. The delivery schedule window 408 displays the first three available dates for delivery, as well as the cost for delivery. In step 378 the operator can select one of these dates and enter the customer's preferred day, with morning or afternoon delivery times. Entering the OK command will continue to return the next available set of possible delivery dates as long as a delivery date has not been selected for up to one month in the future. Once a date has been selected, entering OK saves the selected date, and execution returns to step 370 where the warranty pop-up window (not shown) is displayed in the lower left hand corner of the item entry screen 400.

If in step 374 it is determined that the delivery option has not been selected from the delivery method window 404, execution proceeds to step 379. In step 379, a determination is made whether the UPS shipping option has been selected from the delivery method window 404. If so, execution returns to step 375 and the delivery information window 406 is displayed. If in step 379 it is determined that the UPS option has not been selected, execution proceeds to step 380.

In step 380, a determination is made whether the delayed package pickup option has been selected from the delivery method window 404. If so, execution proceeds to step 382. In step 382, the delayed package pickup window 408 is displayed and execution proceeds to step 384. In step 384 the operator must enter a comment describing when the item will be picked up and execution returns to step 370.

If in step 380 it is determined that the delayed package pickup option has not been selected, execution proceeds to step 386. In step 386, a determination is made whether the freight option has been selected from the delivery method pop-up window 404. If so, execution proceeds to step 388. In step 388, the freight delivery pop-up window (not shown) is displayed in the lower left hand corner of the item entry screen 400. The freight window displays the member address, phone number, and alternate phone number as the default delivery information, and execution proceeds to step 390. In step 390, the operator can strike through the displayed information and fill in information which is different than the default delivery information. Further, the operator must enter the shipping charges and item weight. Once the operator enters the OK command, execution returns to step 370 with the display of the warranty pop-up window (not shown).

FIG. 5 illustrates an initial display screen 500 of the POS checkout registers 16. It is understood that once the customer has interfaced with operators of computers 18 to create a purchase transaction record including the delivery selections, the customer then proceeds to the check-out area 234 and pays for the items purchased by interaction with a register 16. The options available on the screen 500 for selection by the operator of the register 16 in handling customers include sale; no sale; nonsales; item lookup; member lookup; return; redeem credit memo; special order; and price protection refund.

The operator is able to access the customer's transaction record stored in the controller 12 or processor 14 by entering the member number. The member number is entered either by scanning the member card 66 or by keyed entry. The operator is then able to verify the purchases described in the transaction record, along with the various delivery, warranty and other options. The operator is able to edit the transaction record as required. The operator then accepts payment, as previously described.

Figure 6:
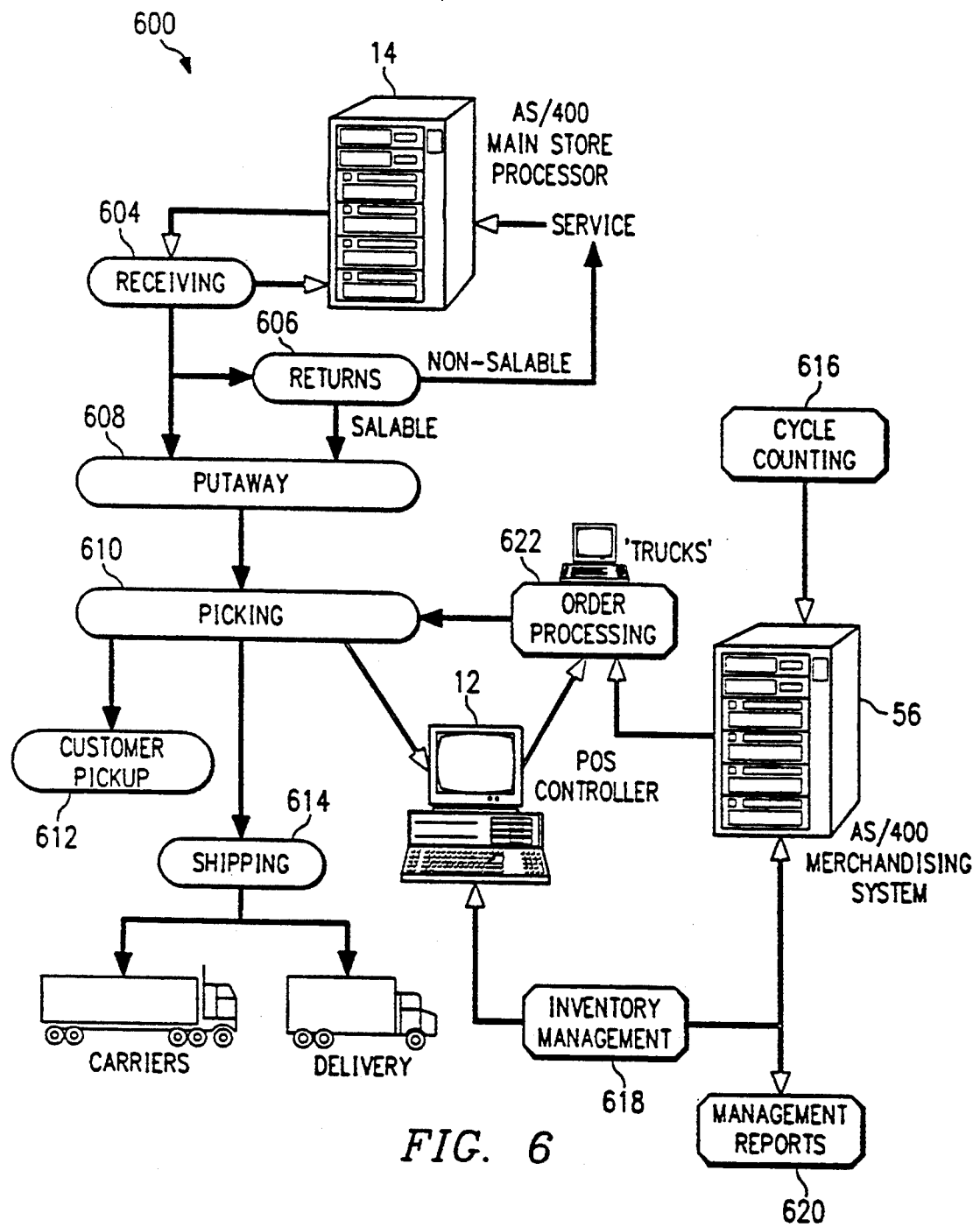
FIG. 6 is a flow diagram of a warehouse distribution system of the system of FIG. 1.

FIG. 6 illustrates a flow diagram of a warehouse inventory management and distribution system 600 for the store 200. The system 600 includes as part of the main store processor 14 the AS/400 distribution center system (DCS) available from IBM. The system 600 tracks merchandise and directs work flow in the warehouse 204.

The system 600 relies on a relational database to track and control movable units of merchandise. The system uses the RF warehouse scanners 40 to provide work direction and to receive inputs from the scanning devices 44. The system 600 allows access to merchandise as soon as an operator releases the transaction record from the computer 18 through the controller 12, by generating a picking ticket in the warehouse 204. The system 600 provides processing in the form of receiving, picking and shipping and also tracking control by interaction with the JDA merchandising system residing in the merchandising system 56. The system 600 interfaces with the controller 12 and the registers 16 for real-time response to customer orders on the floor 202. A sales transaction computer order interface is triggered when a transaction record is furnished from the computers 18 to pass the order information to the DCS system.

In block 604, data regarding merchandise items arriving in the warehouse 204 are recorded in the processor 14 using the scan gun 46. The results are sent to the merchandising system 56. The processor 14 includes equipment for generating bar code labels to be affixed to the items. In block 606, items which are returns are serviced if they are in a nonsaleable condition. Returned items are entered into the processor 14 using the scan gun 46 and the result stored and sent to the merchandising system 56.

Items received in block 602 and saleable items returned in block 604 are put away as indicated in block 608. In block 608, the putaway function directs in real time the activities associated with transferring goods from one area in the distribution center to another. The putaway function interacts with a location map of the facility and determines the preferred and alternate locations for warehousing the item. For example, an environmentally protected item might be one that is contained in a secure cage, in a sprinkler area, or in a special storage for chemicals. One feature of the putaway function is its ability to override the preferred location with alternates. In block 810, order picking is accomplished in an interactive fashion through the use of the portable unit 44. Orders for items are picked for delivery to a specified location (such as pick-up area 206 or 208) utilizing a picking ticket generated by the processor 14 responsive to a transaction record request being received from the computers 18. The picking ticket may be an electronic display on the unit 44 or on a monitor (not shown), or may be printed in hard copy form. Single orders can be picked or employees can do batch or wave picking where many orders are picked simultaneously and sorted at a staging area.

In block 612, the processing of a customer pickup order begins when a picking ticket order is received for an immediate customer pickup at the pickup zone 206 or at the pickup loading dock 208. The picking ticket is presented to a picker based on the picker's responsibility profile. The sequence of handling picking tickets are based on the order type, with customer pickups having the highest priority. Picking tickets of a particular type are usually handled on a first in, first out (FIFO) basis. Once the picker selects an item for picking, a customer pickup label with the customer's name and order number is automatically generated to the picker's portable printer (not shown). After the item is picked and labeled, it is placed upon the conveyor (also not shown). As the item passes a scanner it is diverted to the appropriate location.

In block 814, all information necessary for the shipping interface, freight bills, manifest, and bills of lading are provided. This information is available for use by the merchandising system 56 as well as in a paper printout.

In block 816, cycle counting functions are provided to perform on demand cycle count inventories as well as analysis of cycle count results. Two forms of cycle count inventories are provided. The first is an on-demand cycle count inventory and the second cycle count inventory is based on a queue. The queue cycle count inventory directs a user to a location, item or unit that was determined to be in need of a cycle count. This information is furnished to the system 56.

In block 618, an inventory management function is provided which enables the system 56 to capture inventory adjustments based on the cycle count inventory, changed item status, and merchandise returned to vendors. In block 820, a management report function enables this information to be summarized and furnished to management in reports on a daily basis.

In block 622, an order processing function is provided which is used to create daily truckload schedules for shipping of merchandise from the store 200. The schedules are generated with the aid of a commercially-available decision support tool referred to as Trucks. Trucks is an automated vehicle routing and scheduling software tool that provides a systematic approach to solving transportation issues. Trucks takes into account the constraints on routing and scheduling operations. The order processing function receives information from the controller 12 concerning allocated merchandise and uses this information in processing the delivery.

Figure 7A:
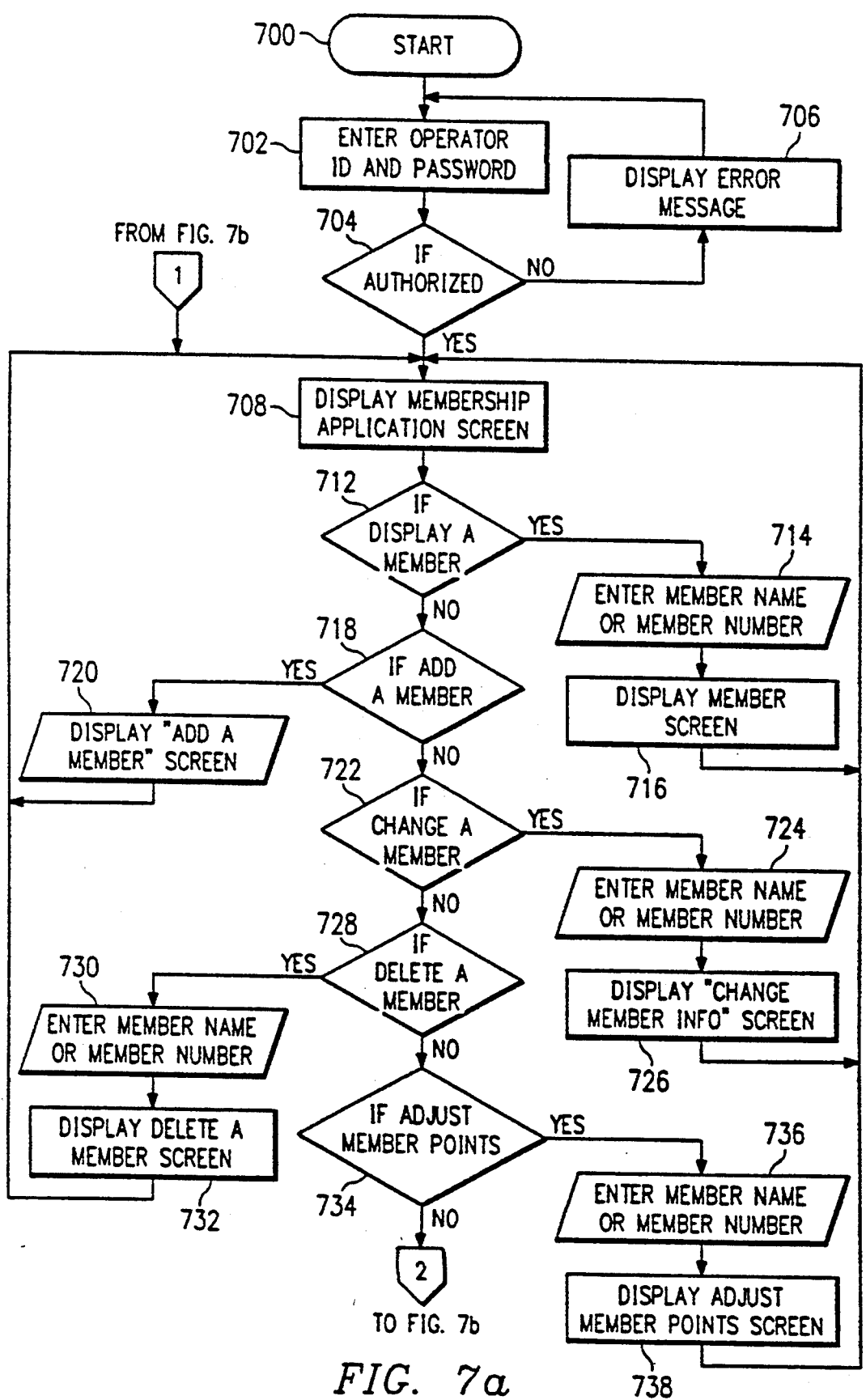
FIGS. 7a–7b are flow charts illustrating logic for implementing member registration functions of the system of FIG. 1.
Figure 7B:
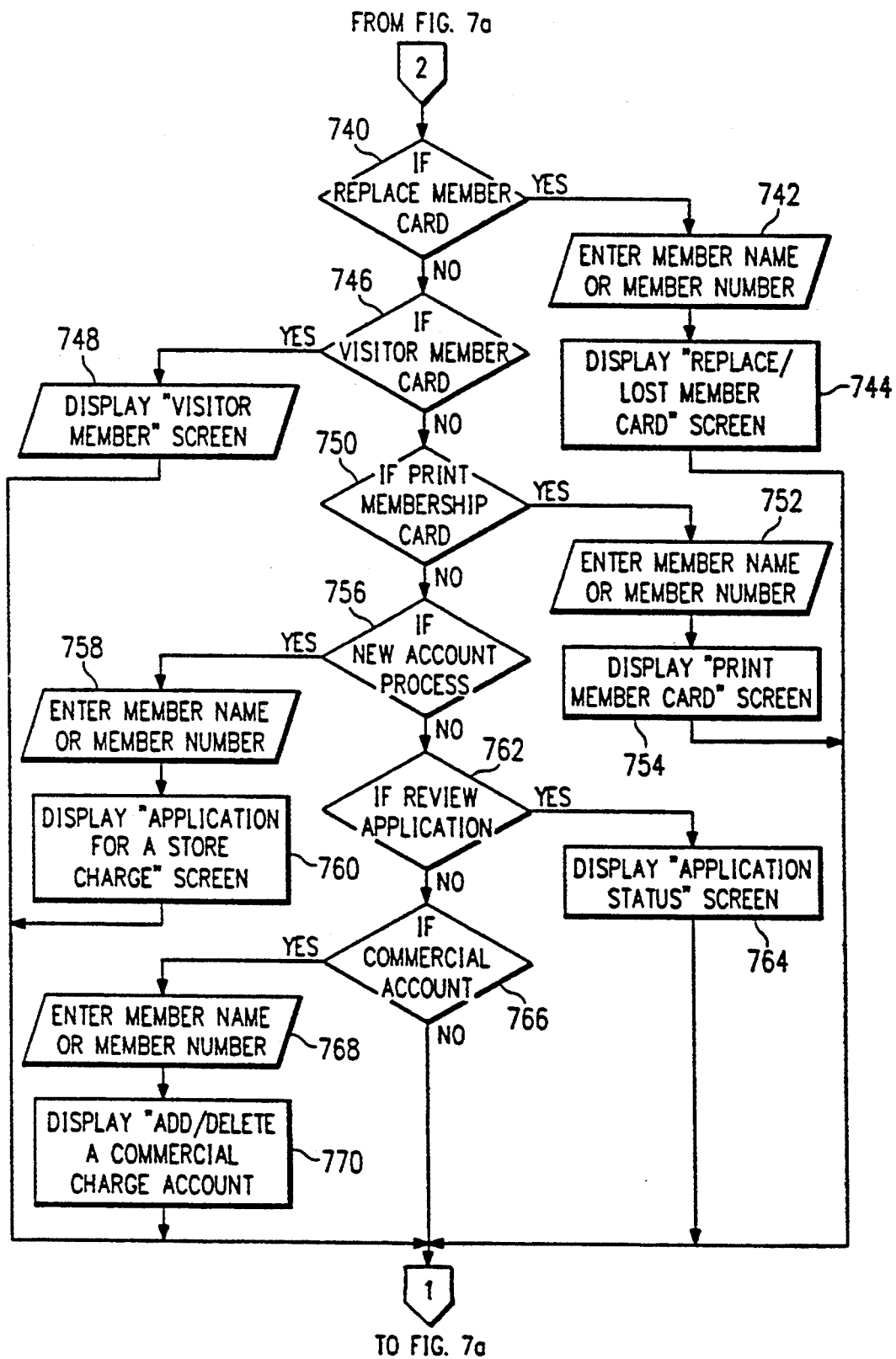

FIGS. 7 and 8 refer to details of the store membership application function utilizing the new member processing system 22. In FIGS. 7a and 7b, flow charts illustrate logic for operating the new member processing system 22 using the PC 214. FIGS. 8a and 8b illustrate screen displays associated with the system 22.

In step 700, execution of the system is initiated. In step 702, the operator enters his operator I.D. and password on the PC 214. In step 704, a determination is made whether the operator is authorized to sign-on to the PC 214. If not, execution proceeds to step 706 and an error message is displayed on the PC 214. If in step 704 it is determined that the operator is authorized to sign-on, execution proceeds to step 708 where a membership application screen 800 (FIG. 8a) is displayed.

The membership application screen 800 provides the operator with eleven display options including display, add, change, and delete a member; adjust member points; replacement/lost member card; visitor member card; print membership card; new store charge account processing; review store charge applications; and commercial charge account processing. After the operator selects the desired option and presses enter, execution proceeds to step 712.

It is understood that the operator is granted authorization on an individual basis for each of the membership options. If the operator is authorized to access the membership option selected, the next screen for the selected membership option is displayed. If the operator is not authorized to access the selected membership option, an error message will be displayed at the bottom of the membership application screen indicating that the operator is not authorized to access that particular membership option. Consequently, the operator will only be able access the membership options that are authorized to him.

In step 712, a determination is made whether the operator has selected the "display a member" option. If so, in step 714, the operator is prompted to enter either the member name or the member number. Upon entering either the member name or the member number, execution proceeds to step 716. In step 716, a member screen 802 (FIG. 8b) is displayed. The member screen 802 contains the member name, address and telephone number in the upper left hand corner of the screen, and the member number and total frequent shopper point value in the upper right hand corner of the screen. The member screen 802 also contains information regarding whether the member has a store charge account, a commercial charge account, the member status code indicating whether the customer is a regular store member (M), a store charge member (T), a visiting member (V), or a commercial charge customer (C). At the bottom of the screen 802 are displayed a number of function keys including an F2 key, or change key, which can enable the operator to enter the change member information option; an F9 key, or print card(s) key, which enables the "print a member card" option; an F10 key, or print screen key, which can enable the printing of the member information contained on the member screen. All of the above information can be printed using a laser printer (not shown) that is attached to the PC 214. An F3 key, or quit key, exits the member screen 802.

If in step 712 it is determined that the operator does not want the "display a member" option, in step 718, a determination is made whether the operator has selected an "add a member" option. If so, in step 720, an add-a-member screen (not shown) is displayed. The following information must be added to process a new member: the member number, last name, first name, address, and country. Further, actuation of the F2 key, or new charge key, enables a new store charge account processing function. If in step 718 it is determined that the operator does not wish the add a member option, execution proceeds to step 722.

In step 722, a determination is made whether the operator has selected the "change a member" option from the membership application screen 800. If so, in step 724 the operator is prompted to enter either the member name or the member number. Upon entry of either the member name or the member number, execution proceeds to step 726. In step 726, the "change a member" screen is displayed to enable the operator to change the following data: the member last name, first name, address, phone number, status and negative check status. The F3 key, or quit key, issued to exit out of the change a member option. If in step 722 it is determined that the operator has not selected the "change a member" option, execution proceeds to step 728.

In step 728, a determination is made whether the delete a member option has been selected. If so, in step 730 the operator is prompted to enter either the member name or the member number. Upon entering either the member number or the member name, execution proceeds to step 732. In step 732, the delete a member screen is displayed and the operator has the ability to delete the member from the membership file by entering "D" in the appropriate field on the "delete a member" screen, and then actuating an "enter" command. An "escape" command exits out of the "delete a member" option and execution returns to step 708. If in step 728 it is determined the operator has not selected the "delete a member" option, then execution proceeds to step 734.

In step 734, a determination is made whether the operator has selected the "adjust member points" option. If so, in step 736 the operator is prompted to enter the member name or the member number. Upon entering either the member name or the member number, execution proceeds to step 738. In step 738, the "adjust member points" screen is displayed and a member's points can be adjusted. To adjust a member's points, the operator enters a "+" or "−" in the first position in the data field and then enters the number of points to be added or subtracted from the total number of points. The escape command exits out of the "adjust member points" option and execution returns to step 708. If in step 734 it is determined the operator has not selected the adjust member points option, execution proceeds to step 740.

In step 740 (FIG. 7b), a determination is made whether the operator has selected the "replacement/lost member card" option. If so, in step 742 the operator is prompted to enter the member name or the member number. Upon entering either the member name or the member number, execution proceeds to step 744. In step 744, the replacement/lost member card screen is displayed. This display allows the operator to replace a member's card that has been lost, stolen or should be closed. From the replacement/lost member card screen, the operator can modify the member information on the screen, including providing the member a new member number, change of the member name, address, business phone number and number of additional cards, if any. The operator then can actuate the escape command to return to step 708. If in step 740 it is determined the operator has not selected the "replacement/lost member card" option, execution proceeds to step 746.

In step 746, a determination is made whether the operator has selected the "visitor member card" option. If so, in step 748 the visitor member card screen is displayed. The visitor member card option allows a visiting member to open a membership at an alternate store 200. However, the frequent shopper points that are earned at a visiting store are not accumulated under the visiting store member number, and are added to the visitor's total at his home store. Store personnel are responsible for calling or sending the visitor member information to the member's home store. The point total is adjusted at the home store as previously described in step 734. The information required for a visitor member card is analogous to the information required in step 718 for the add a member option. The escape command returns the operator to step 708. If in step 746 it is determined that the operator has not selected the visitor member card card option, execution proceeds to step 750.

In step 750, a determination is made whether the "print membership card" option has been selected. If so, in step 752, the operator is prompted to enter the member name or the member number. Upon entering either the member name or the member number, execution proceeds to step 754. In step 754, the print member card screen is displayed. The print member card screen allows the operator to print additional membership cards for family members or for members who need temporary cards. A maximum of nine membership cards can be printed at one time. The escape command allows the operator to exit out of the print member card option and return to step 708. If in step 750 it is determined that the operator has not selected the print membership card option, execution proceeds to step 756.

In step 756, a determination is made whether the operator has selected the new account process option. If so, in step 758 the operator is prompted to enter the member name or the member number. Upon entering the member name or the member number, execution proceeds to step 760. In step 760, the application for a thunder charge screen is displayed. The application for a store charge screen requires that the operator supply the system with additional information concerning the applicant, including the member's driver license number, social security card, date of birth, whether the member wishes credit insurance and his credit limit. In addition, the home phone field is a required field for this option. Additional information is collected regarding the application. The escape command returns the operator to step 708. If in step 762 it is determined the operator does not wish to review the application, execution proceeds to step 766.

In step 766, a determination is made whether the operator has selected the "commercial account" option. If so, in step 768 the operator is prompted to enter either the member name or the member number. Upon entering either the member name or the member number execution proceeds to step 770. In step 770, the add a commercial charge account screen (not shown) is displayed if the member does not have a commercial charge account number, or the delete a commercial charge account screen is displayed if the member has a commercial charge account number. The escape key command returns the operator to step 410. If in step 466 it is determined that the operator has not selected the commercial charge account option, execution returns to step 708.

It is understood that variations may be made in the present invention without departing from the spirit and scope of the invention. For example, the system 10 may be configured using alternative brands and arrangements of computer equipment and support software to perform the functions described. The components of the system 10 may be alternatively integrated. The system 10 may be utilized for managing the warehousing, order and delivery of any type of item. The system 10 may also be used as an inventory management tool for performing item shelf count or restocking functions by store personnel.

Although illustrative embodiments of the invention have been shown and described, a latitude of modification, change and substitution is intended in the foregoing disclosure, and in certain instances some features of the invention will be employed without a corresponding use of other features. Accordingly, it is appropriate that the appended claims be construed broadly and in a manner consistent with the scope of the invention.

What is claimed is:

1. Apparatus for processing merchandise sale transactions for customers in a point of sale and warehouse facility, the apparatus comprising:

a main processor including a database for storing customer identification information and merchandise information and including program instructions for processing a sale transaction record for each customer;

a point of sale system coupled with said main processor, said point of sale system including a controller coupled to said main processor, and at least one portable computer coupled to said controller via radio frequency transmissions, and including program instructions responsive to entry of a customer identification number for accessing said database to display customer identification information and for generating said sale transaction record;

said point of sale system including item entry means responsive to entry of a merchandise item identification number for accessing said database to display merchandise information pertaining to said item to the customer and for selecting said item for addition to said sale transaction record;

said point of sale system including delivery method entry means for displaying merchandise delivery method information to the customer and for selecting delivery method instructions for addition to said sale transaction record; and said point of sale system including total command means for indicating acceptance of said sale transaction record by the customer and for transmitting said sale transaction record to said main processor to effectuate warehouse delivery of said selected merchandise items to the customer according to said selected delivery method instructions.

2. The apparatus of claim 1 further comprising a check-out system coupled with said point of sale system including program instructions responsive to entry of said customer identification number for accessing said sale transaction record and accepting payment for said selected merchandise items; and a warehouse system coupled with said main processor, said warehouse system including program instructions responsive to said acceptance indication of said sale transaction record from said command means for generating a merchandise pick request in said warehouse to locate said selected merchandise and initiate delivery of said merchandise according to said selected delivery method instructions.

3. The apparatus of claim 1 wherein said point of sale system further comprises a server connected on a time-shared network to said controller, said at least one portable computer coupled via said radio frequency transmissions to said server.

4. The apparatus of claim 1 wherein said at least one portable computer comprises a hand-held computer.

5. The apparatus of claim 1 wherein said at least one portable computer includes an infrared scanning device for entering data.

6. The apparatus of claim 1 wherein said controller is coupled with said processor utilizing a synchronous data link control (SDLC) protocol.

7. The apparatus of claim 1 wherein said customer identification number is entered into said at least one portable computer from a customer membership card associated with the customer.

8. The apparatus of claim 7 wherein said at least one portable computer includes an infrared scanner and said customer identification number is entered by scanning said membership card.

9. The apparatus of claim 2 wherein said check-out system is connected to a remote credit processing facility via said point of sale system.

10. Apparatus for processing merchandise sale transactions for customers in a point of sale and warehouse facility, the apparatus comprising:

a main processor including a database for storing customer identification information and merchandise information and including program instructions for processing a sale transaction record for each customer;

a point of sale system coupled with said main processor, said point of sale system including program instructions responsive to entry of a customer identification number for accessing said database to display customer identification information and for generating said sale transaction record;

said point of sale system including item entry means responsive to entry of a merchandise item identification number for accessing said database to display merchandise information pertaining to said item to the customer and for selecting said item for addition to said sale transaction record;

said point of sale system including delivery method entry means for displaying merchandise delivery method information to the customer and for selecting delivery method instructions for addition to said sale transaction record;

said point of sale system including total command means for indicating acceptance of said sale transaction record by the customer and for transmitting said sale transaction record to said main processor to effectuate warehouse delivery of said selected merchandise items to the customer according to said selected delivery method instructions;

a warehouse system coupled with said main processor, said warehouse system including program instructions responsive to said acceptance indication of said sale transaction record from said command means for generating a merchandise pick request in said warehouse to locate said selected merchandise and initiate delivery of said merchandise according to said selected delivery method instructions; and a check-out system coupled with said point of sale system, said check-out system including program instructions responsive to entry of said customer identification number for accessing said sale transaction record and accepting payment for said selected merchandise items.

11. The apparatus of claim 10 wherein said sale transaction record for each customer includes information indicating the customer identification number, customer name, item number, description, price and delivery method for each selected item of merchandise.

12. The apparatus of claim 10 wherein said sale transaction record for each customer includes information indicating the customer identification number, accumulated frequent shopper points for the customer, item number, description, price and delivery method for each selected item of merchandise.

13. The apparatus of claim 12 wherein said item entry means includes means for selecting purchase of items by the customer at a reduced price utilizing frequent shopper points subtracted from said accumulated total of points available for the customer.

14. The apparatus of claim 10 wherein said item entry means includes command means for verifying selection of each selected item and for cancelling selection of each selected item.

15. The apparatus of claim 10 wherein said point of sale system further comprises means for displaying additional products required for a selected item and for adding customer-selected ones of said additional products to said sale transaction record.

16. The apparatus of claim 10 wherein said point of sale system further comprises means for displaying suggested accessories for a selected item and for adding customer-selected ones of said accessories to said sale transaction record.

17. The apparatus of claim 10 wherein said point of sale system further comprises:
   modify command means for altering said sale transaction record and for transmitting a modified sale transaction record to said main processor; and
   responsive to an acceptance indication of said modified sale transaction record, said warehouse system generates a merchandise reverse-pick request in said warehouse to initiate cancellation of a previously issued pick request.

18. The apparatus of claim 10 further comprising a new member processing system coupled to said controller for entering customer information in said database, said system comprising:
   means for adding a customer to said database by issuing a customer identification number for association with customer name, address and credit data;
   means for displaying customer information; and
   means for issuing a customer member card including said customer identification.

19. The apparatus of claim 10 further comprising an entry scanner system coupled to said controller, said scanner system for receiving a customer's identification number upon entry into said point of sale portion of said facility.

20. The apparatus of claim 19 wherein said received customer identification information is utilized to display the customer's name in the point of sale portion of said facility.

21. A method for processing merchandise sale transactions for customers in a point of sale and warehouse facility, the method comprising:
   storing customer identification information, merchandise information and a sale transaction record for each customer in a database;
   entering a customer identification number to access said database for display of the customer's identification information and to generate said sale transaction record;
   entering a merchandise item identification number for accessing said database to display merchandise information pertaining to said item and for selecting said item for addition to said sale transaction record;
   displaying merchandise delivery method information to the customer for selecting delivery method instructions and for adding said instructions to said sale transaction record; and
   indicating acceptance of said sale transaction record by the customer to effectuate warehouse delivery of said selected merchandise items to the customer according to said selected delivery method instructions.

22. The method of claim 21 further comprising generating a merchandise pick request in said warehouse, responsive to said acceptance indication of said sale transaction record, to locate said selected merchandise and to initiate delivery of said merchandise according to said selected delivery method instructions.

23. The method of claim 21 further comprising accessing said sale transaction record and accepting payment for said selected merchandise items.

* * * * *